US011960124B2

(12) United States Patent
Trezise

(10) Patent No.: US 11,960,124 B2
(45) Date of Patent: Apr. 16, 2024

(54) PULL-BACK FIBER OPTIC CABLE INSTALLATION FOR MULTI DWELLING UNITS FOR MINIMIZING AN UNUSED LENGTH OF FIBER

(71) Applicant: PPC BROADBAND FIBER LTD., Woodbridge (GB)

(72) Inventor: Shaun Trezise, Aldeburgh (GB)

(73) Assignee: PPC BROADBAND FIBER LTD., Woodbridge (GB)

( * ) Notice: Subject to any disclaimer, the term of this patent is extended or adjusted under 35 U.S.C. 154(b) by 0 days.

(21) Appl. No.: 16/893,384

(22) Filed: Jun. 4, 2020

(65) Prior Publication Data
US 2020/0400893 A1 Dec. 24, 2020

Related U.S. Application Data

(60) Provisional application No. 62/857,271, filed on Jun. 4, 2019.

(51) Int. Cl.
*G02B 6/38* (2006.01)
*G02B 6/44* (2006.01)

(52) U.S. Cl.
CPC ......... *G02B 6/3806* (2013.01); *G02B 6/3893* (2013.01); *G02B 6/4455* (2013.01)

(58) Field of Classification Search
CPC ... G02B 6/3806; G02B 6/3893; G02B 6/4455
(Continued)

(56) References Cited

U.S. PATENT DOCUMENTS 5,708,753 A * 1/1998 Frigo .................. H04B 10/032
385/24
6,215,930 B1 * 4/2001 Estes .................. G02B 6/4475
385/100
(Continued)

FOREIGN PATENT DOCUMENTS

ES 2608892 T3 * 4/2017 ............... G02B 6/44
JP 2008129170 A 6/2008
(Continued)

OTHER PUBLICATIONS

Search Report dated Sep. 14, 2020 in corresponding International Application No. PCT/US2020/036210, 4 pages.
(Continued)

*Primary Examiner* — Kaveh C Kianni
(74) *Attorney, Agent, or Firm* — MH2 TECHNOLOGY LAW GROUP LLP

(57) ABSTRACT

A pull-back fiber cable installation for multi dwelling units includes a first distribution point disposed between a first group of twelve units and a second group of twelve units, a second distribution point disposed between a third group of twelve units and a fourth group of twelve units, and a twelve fiber distribution cable optically connected to the first and second distribution points. Each fiber of the distribution cable is cut between the first and second distribution point. A first portion of the cut fiber is spliced to a first drop cable that runs to a first unit of the second group of twelve units, and a second portion of the cut fiber is spliced to a second drop cable that runs to a first unit of the third group of twelve units.

18 Claims, 3 Drawing Sheets

(58) Field of Classification Search
USPC .......................................................... 385/102
See application file for complete search history.

(56) References Cited

U.S. PATENT DOCUMENTS

| | | | | |
|---|---|---|---|---|
| 6,427,042 | B1* | 7/2002 | Dyke | G02B 6/4472 385/100 |
| 6,542,267 | B1* | 4/2003 | Nicholson | H04Q 11/0062 398/59 |
| H2075 | H* | 8/2003 | Gnauck | 398/58 |
| 6,724,319 | B1* | 4/2004 | Knaack | G01H 9/004 359/290 |
| 6,728,165 | B1* | 4/2004 | Roscigno | G01H 9/004 181/102 |
| 10,063,313 | B1* | 8/2018 | Al Sayeed | H04J 14/029 |
| 10,374,746 | B1* | 8/2019 | Lawrence | H04B 10/25 |
| 2006/0093303 | A1* | 5/2006 | Reagan | G02B 6/4442 385/76 |
| 2006/0193574 | A1* | 8/2006 | Greenwood | G02B 6/4475 385/103 |
| 2006/0193575 | A1* | 8/2006 | Greenwood | G02B 6/4495 385/100 |
| 2006/0245687 | A1* | 11/2006 | Gall | H04B 10/272 385/24 |
| 2006/0245688 | A1* | 11/2006 | Gall | H04B 10/272 385/24 |
| 2007/0140639 | A1* | 6/2007 | Temple, Jr. | G02B 6/4475 385/100 |
| 2007/0140640 | A1* | 6/2007 | Temple, Jr. | G02B 6/4475 385/100 |
| 2011/0239266 | A1* | 9/2011 | Brooks | H04B 10/85 398/141 |
| 2011/0318003 | A1* | 12/2011 | Brooks | G02B 6/35 398/45 |
| 2014/0226939 | A1* | 8/2014 | Boxer | G02B 6/4401 385/106 |
| 2015/0355428 | A1* | 12/2015 | Leeman | G02B 6/4455 385/135 |
| 2017/0235083 | A1 | 8/2017 | Sales Casals | |
| 2018/0128982 | A1* | 5/2018 | Jensen | G02B 6/4471 |
| 2018/0136426 | A1* | 5/2018 | Rousseaux | G02B 6/4471 |
| 2018/0213305 | A1* | 7/2018 | Campos | H04Q 11/0005 |
| 2020/0081215 | A1* | 3/2020 | Maricevic | H04B 10/27 |

FOREIGN PATENT DOCUMENTS

| | | |
|---|---|---|
| WO | 2007037845 A2 | 4/2007 |
| WO | 2008134848 A1 | 11/2008 |

OTHER PUBLICATIONS

Written Opinion dated Sep. 14, 2020 in corresponding International Application No. PCT/US2020/036210, 12 pages.

* cited by examiner

PULL-BACK FIBER OPTIC CABLE INSTALLATION FOR MULTI DWELLING UNITS FOR MINIMIZING AN UNUSED LENGTH OF FIBER

CROSS-REFERENCE TO RELATED APPLICATION

This nonprovisional application claims the benefit of U.S. Provisional Application No. 62/857,271, filed Jun. 4, 2019. The disclosure of the prior application is hereby incorporated by reference herein in its entirety.

TECHNICAL FIELD

This disclosure relates generally to the field optical fiber networks. In particular, this disclosure relates to a pull-back fiber cable installation for multi dwelling units.

BACKGROUND

As demand for data and connectivity increases, network planners and installers are seeking more efficient and cost-effective deployment options for their fiber to the X (FTTX) rollouts. FTTX comprises the many variants of fiber optic access infrastructure. These include fiber to the home (FTTH), fiber to the premise (FTTP), fiber to the building (FTTB), fiber to the node (FTTN), and fiber to the curb or cabinet (FTTC). The optical FTTP or FTTH network is an optical access network that supplies broadband or ultra-broadband communication services to a number of end users (e.g., services that require data transmission speeds measuring several hundred Mbit/s or even higher).

An optical FTTP or FTTH network typically includes a distribution point, for example, a fiber distribution hub (FDH), which is typically located in the basement or vault of a multi-dwelling units (MDU) building in which the end users reside. A multi-fiber distribution cable typically leads out of the distribution hub to a fiber connection point that is typically located remote from the distribution hub.

A distribution cable can be connected optically to one or more drop cables. As used herein, a "drop cable" is an optical fiber cable that typically runs towards a dwelling or office of an end user within a special duct fixed to the surface of the wall or housed within the thickness thereof. To connect the distribution cable to a drop cable, an optical fiber is pulled out of the distribution cable/duct and spliced to an end of an optical fiber of the drop cable. A fiber splice closure may provide environmental protection for the splicing, management, and storage of the drop cable.

In conventional installations, the distribution cable, for example, a twelve fiber or twenty-four fiber cable, runs toward the end users of the MDU. In some installations 100, two twelve fiber distribution cables may be used. As shown in FIG. 1, two twelve fiber distribution cables 110, 120 extend from a distribution point 130 to provide broadband or ultra-broadband communication services to twenty-four dwellings of an MDU. The first cable 110 provides services to dwellings 1-12, and the second cable 120 provides services to dwellings 13-24. As the first cable 110 reaches dwelling 1, a first one of the fibers F1 is removed from the first cable 110. The first fiber F1 is cut and the end of the fiber F1 that is still optically connected to the distribution point 130 is spliced to a drop cable D1 at a fiber splice closure C1. The drop cable D1 runs from the fiber splice closure C1 to dwelling 1.

In the aforementioned installation, the remaining length of fiber F1 that was cut at the fiber splice closure C1 is therefore wasted as it runs the remaining length of the distribution cable to the distalmost dwelling, for example, dwelling 12. Or even worse yet, if both distribution cables 110, 120 run the entire length of all twenty-four dwellings, even more length of fiber F1 is wasted. The amount of waste of each successive one of the fibers F2-F13 may be less than the previous, but there is still a wasted length of fiber associated with each dwelling installation except for the distalmost dwelling, for example, dwelling 24.

In an alternative installation, the fiber distribution point may be centrally located at the MDU so that the range of drop cable run lengths is reduced, which in turn reduces the amount of wasted fiber relative to the aforementioned installation. However, the alternative installation would still produce wasted fiber optic cable lengths for the dwellings that are not distalmost to the fiber distribution point.

Therefore, it may be desirable to provide a pull-back fiber cable installation for multi dwelling units that maximizes fiber utilization and thus minimizes wasted length of fiber.

SUMMARY

According to some embodiments of the disclosure, a single cable is installed down the corridor instead of multiple cables. Additional distribution points are created instead of a single distribution point receiving multiple distribution cables. The distribution cable is window cut and fibers are pulled back in varying directions depending on the location of the respective mating distribution box. Fiber that would typically remain dormant and unused is instead connected to the distribution box and used to service additional subscribers.

Placing distribution boxes in central location means that fibers can be pulled back in either direction (effectively, both ends of the fiber are used), and thus doubling the total number of accessible subscribers. If additional 'slave' distribution points are set up, the same 12-fiber cable can connect further subscribers (limitless) provided that the distributions points are all connected (using an additional cable).

Additionally, for passive optical network (PON) installations, fiber from the same distribution cable is used to connect subscribers to the splitters, and to connect the splitters to the main distribution fiber. This installation negates the need to install additional cable to feed the inputs of the splitter modules.

In PON applications, the concept is to use 8 fibers to connect subscribers and to use the additional 4 fibers as the input fiber for the splitters. Where distribution points (containing splitter modules) are located between dwellings as mentioned above, 1×16 way splitters can be used instead of 1×8 splitters. The 4 fibers that remain for the input of the splitter can therefore each power a splitter back to the main distribution point, allowing for up to 64 subscribers to be connected from a 12-fibre cable. If additional slave distribution points are created and connected in parallel, the number of dwellings on a single floor that can be connected is limitless.

According to various embodiments of the disclosure, a fiber cable installation for multiple units includes a first distribution point disposed between a first group of units and a second group of units, a second distribution point disposed between a third group of units and a fourth group of units, and a fiber distribution cable optically connected with the first and second distribution points. The first group of units, the second group of units, the third group of units, and the fourth group of units include a first number of units, and the fiber distribution cable includes a second number of fibers that is greater than or equal to the first number of units. The first distribution point and the second distribution point are configured to be optically coupled with a base station of an optical access network so as to provide optical signals from the base station to the first, second, third, and fourth groups of units. A first fiber of the distribution cable is cut between the first and second distribution points, a first portion of the cut first fiber is configured to provide an optical signal to a first unit of the second group of units, and a second portion of the cut first fiber is configured to provide an optical signal to a first unit of the third group of units.

In some aspects of the fiber cable installation, the first portion of the cut first fiber is spliced to a first drop cable that runs to the first unit of the second group of units, and the second portion of the cut first fiber is spliced to a second drop cable that runs to the first unit of the third group of units.

In accordance with various embodiments of the disclosure, a passive optical network for multiple units includes a first splitter disposed between a first group of units and a second group of units, a second splitter disposed between a third group of units and a fourth group of units, and a fiber distribution cable optically coupling the first splitter and the second splitter to a distribution point. The first group of units, the second group of units, the third group of units, and the fourth group of units include a first number of units, and the fiber distribution cable includes a second number of fibers that is greater than the first number of units. A first fiber of the distribution cable is configured to provide an optical input to the first splitter, and a second fiber of the distribution cable is configured to provide an optical input to the second splitter. A third fiber of the distribution cable is cut between the first splitter and the second splitter, a first portion of the cut third fiber is configured to provide an optical signal to a first unit of the second group of units, and a second portion of the cut third fiber is configured to provide an optical signal to a first unit of the third group of units.

In some aspects of the passive optical network, the distribution point is configured to be optically coupled with a base station of an optical access network so as to provide optical signals from the base station to the first, second, third, and fourth groups of units.

In various aspects of the passive optical network, the first portion of the cut third fiber is spliced to a first drop cable that runs to the first unit of the second group of units, and the second portion of the cut third fiber is spliced to a second drop cable that runs to the first unit of the third group of units.

Some aspects of the passive optical network further include a third splitter disposed between a fifth group of units and a sixth group of units. The fiber distribution cable optically couples the third splitter to a distribution point, and a fourth fiber of the distribution cable is configured to provide an optical input to the third splitter.

In various aspects of the passive optical network, the third fiber of the distribution cable is cut between the third splitter and the second splitter, a third portion of the cut third fiber is configured to provide an optical signal to a first unit of the fourth group of units, and a fourth portion of the cut third fiber is configured to provide an optical signal to a first unit of the fifth group of units. In some aspects, the third portion of the cut third fiber is spliced to a third drop cable that runs to the first unit of the second group of units, and the fourth portion of the cut third fiber is spliced to a fourth drop cable that runs to the first unit of the third group of units.

In various aspects of the passive optical network, a fifth fiber of the distribution cable is cut between the third splitter and the second splitter. A first portion of the cut fifth fiber is configured to provide an optical signal to a first unit of the fourth group of units, and a second portion of the cut fifth fiber is configured to provide an optical signal to a first unit of the fifth group of units. In some aspects, the first portion of the cut fifth fiber is spliced to a third drop cable that runs to the first unit of the fourth group of units, and the second portion of the cut fifth fiber is spliced to a fourth drop cable that runs to the first unit of the fifth group of units.

In some aspects of the passive optical network, the fifth group of units and the sixth group of units include the first number of units.

According to some embodiments of the disclosure, an optical fiber network for multiple units includes a first optical module disposed between a first group of units and a second group of units, a second optical module disposed between a third group of twelve units and a fourth group of units, and a fiber distribution cable optically coupled with the first and second optical modules. The first group of units, the second group of units, the third group of units, and the fourth group of units include a first number of units, and the fiber distribution cable includes a second number of fibers that is greater than or equal to the first number of units. A first fiber of the distribution cable is cut between the first optical module and the second optical module, a first portion of the cut first fiber is configured to provide an optical signal to a first unit of the second group of units, and a second portion of the cut first fiber is configured to provide an optical signal to a first unit of the third group of units.

In some aspects of the optical fiber network, the first portion of the cut first fiber is spliced to a first drop cable that runs to the first unit of the second group of units, and the second portion of the cut first fiber is spliced to a second drop cable that runs to the first unit of the third group of units.

In various aspects of the optical fiber network, the first optical module is a first distribution point, and the second optical module is a second distribution point, and the first distribution point and the second distribution point are configured to be optically coupled with a base station of an optical access network so as to provide optical signals from the base station to the first, second, third, and fourth groups of units.

According to some aspects of the optical fiber network, the first optical module is a first splitter, and the second optical module is a second splitter. The first splitter and the second splitter are optically coupled with a distribution point, and a second fiber of the distribution cable is configured to provide an optical input from the distribution point to the first splitter, and a third fiber of the distribution cable is configured to provide an optical signal from the distribution point to the second splitter.

In some aspects of the optical fiber network, the distribution point is configured to be optically coupled with a base station of an optical access network so as to provide optical signals from the base station to the first, second, third, and fourth groups of units.

According to various aspects of the optical fiber network, the optical fiber network includes a third splitter disposed between a fifth group of units and a sixth group of units. The fiber distribution cable optically couples the third splitter to the distribution point, and a fourth fiber of the distribution cable is configured to provide an optical from the distribution point to the third splitter.

In various aspects of the optical fiber network, the first fiber of the distribution cable is cut between the third splitter and the second splitter, a third portion of the cut first fiber is configured to provide an optical signal to a first unit of the fourth group of units, and a fourth portion of the cut first fiber is configured to provide an optical signal to a first unit of the fifth group of units.

According to some aspects of the optical fiber network, wherein the third portion of the cut first fiber is spliced to a third drop cable that runs to the first unit of the fourth group of units, and wherein the fourth portion of the cut first fiber is spliced to a fourth drop cable that runs to the first unit of the fifth group of units.

In some aspects of the optical fiber network, a fifth fiber of the distribution cable is cut between the third splitter and the second splitter, a first portion of the cut fifth fiber is configured to provide an optical signal to a first unit of the fourth group of units, and a second portion of the cut fifth fiber is configured to provide an optical signal to a first unit of the fifth group of units.

According to various aspects of the optical fiber network, the first portion of the cut fifth fiber is spliced to a third drop cable that runs to the first unit of the fourth group of units, and the second portion of the cut fifth fiber is spliced to a fourth drop cable that runs to the first unit of the fifth group of units.

BRIEF DESCRIPTION OF THE FIGURES

For a further understanding of the invention, reference will be made to the following detailed description of the invention which is to be read in connection with the accompanying drawing and in which like numbers refer to like parts, wherein.

DETAILED DESCRIPTION

As a preface to the detailed description, it should be noted that, as used in this specification and the appended claims, the singular forms "a", "an" and "the" include plural referents, unless the context clearly dictates otherwise.

Figure 2:
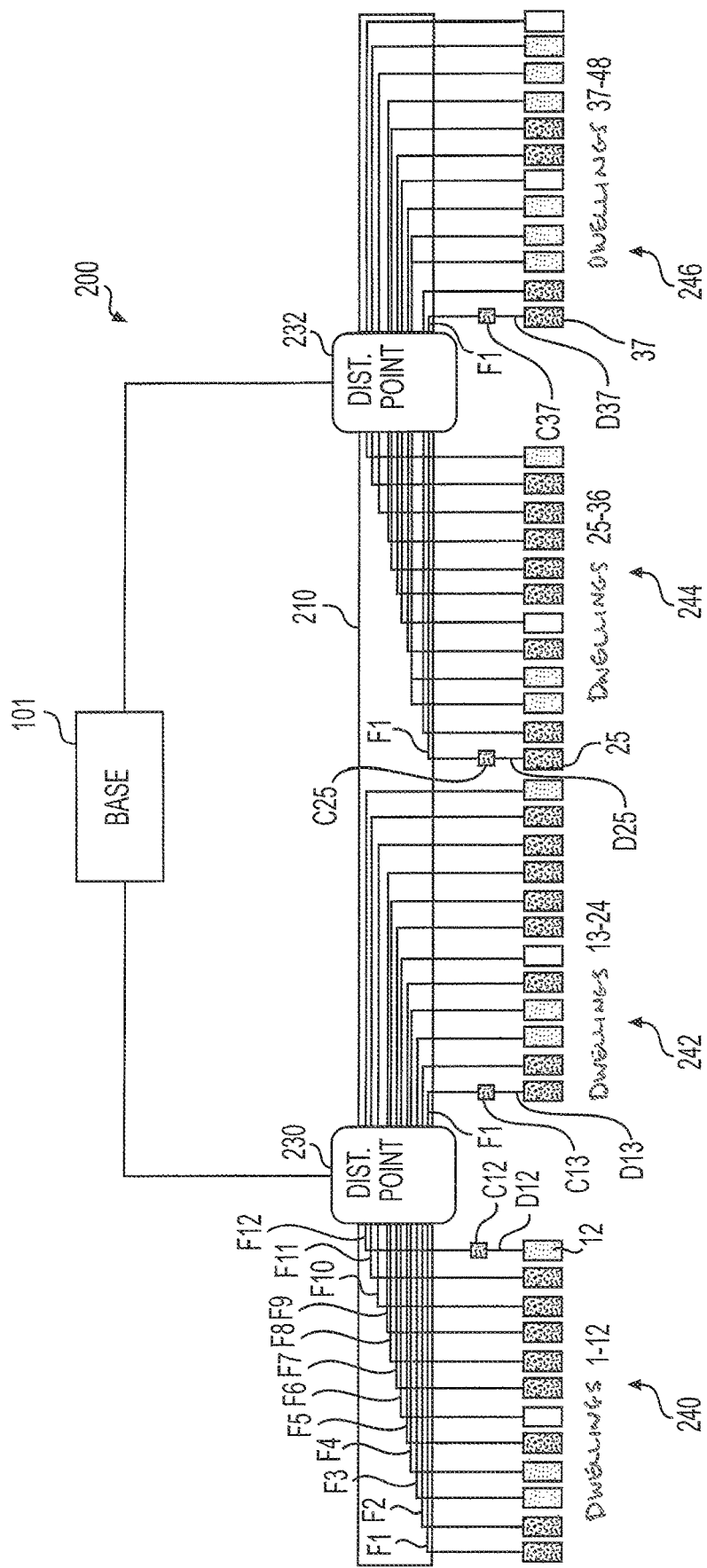
FIG. 2 is a schematic illustration of an exemplary pull-back fiber cable installation for multi dwelling units in accordance with various aspects of the disclosure.

FIG. 2 illustrates an exemplary pull-back fiber cable installation 200 for multi dwelling units in accordance with various aspects of the disclosure. Although a dwelling typically refers to a house, dwelling, or other place of residence, in the context of this application, it should be understood that dwelling also includes office buildings, hotels, and any other structure having multiple units. In the exemplary installation 200, a first distribution point 230 is disposed between two groups of twelve dwellings—a first group 240 and a second group 242. The first group 240 includes dwelling units 1-12, and the second group 242 includes dwelling units 13-24. A second distribution point 232 is disposed between two groups of dwelling units—a third group 244 and a fourth group 246. The third group 244 includes dwelling units 25-36 and the fourth group 246 includes dwelling units 37-48. It should be appreciated that additional dwellings and additional distribution points may be provided for larger MDUs. The distribution points 230, 232 are configured to provide an optical connection back to a base station 101 or home of an FFTx optical access network.

Figure 1:
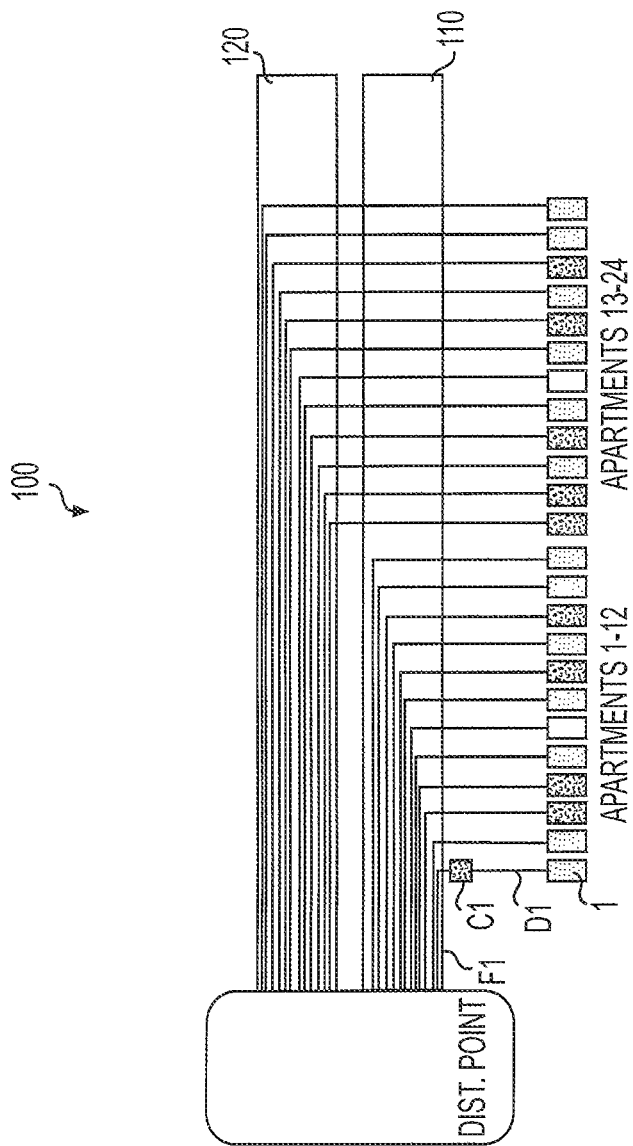
FIG. 1 is a schematic illustration of a conventional pull-back fiber cable installation for multi dwelling units.

A twelve fiber distribution cable 210 runs the length from dwelling 1 to dwelling 48 and is optically connected with the first and second distribution points 230, 232. For example, each of the twelve fibers F1-F12 of the fiber distribution cable 210 is cut at the first and second distribution points 230, 232, and the two ends created by the cut can be optically coupled with the respective distribution point in order to optically couple the distribution points 230, 232 with the base and to receive an optical signal or input. As with the conventional installation described above with respect to FIG. 1, as the cable 210 extends from the first distribution point 230 and is at or near dwelling 12, a twelfth one of the fibers F12 is cut and removed from the cable 210, as would be understood by persons skilled in the art. For example, a window can be cut through the outer sheath of the distribution cable to expose at least the twelfth fiber F12. The twelfth fiber F12 is cut and the newly cut end of the fiber F12, which is still optically connected to the first distribution point 230, can be spliced to a drop cable D12, for example, at a fiber splice closure C12. The drop cable D12 is configured to run from the fiber splice closure C12 to dwelling 12.

Although not shown for clarity purposes, one or more of the other fibers F1-F11 can be removed from the distribution cable 210 by cutting additional windows at or near each respective dwelling 1-11. The newly cut ends of the respective fibers F1-F11, which are still optically connected to the first distribution point 230, can be spliced to a respective drop cable (not shown) similar to drop cable D12, for example, at a fiber splice closure (not shown) similar to closure C12 and run to dwellings 1-11. Thus, progressively smaller amounts of fibers F1-F12 are wasted as the cable 210 extends to from the first distribution point 230 to dwelling 1.

As the cable 210 extends from the first distribution point 230 to the second distribution point 232, the cable 210 runs past dwelling units 13-24 (second group 242) and dwelling units 25-36 (third group 244). As the cable 210 extends from the first distribution point 230 and reaches dwelling 13, the first fiber F1 can be cut and removed from the cable 210, as described above. The cut end of the first fiber F1, which is still optically connected to the first distribution point 230, can be spliced to a drop cable D13, for example, at a fiber splice closure C13. The drop cable D13 is configured to run from the fiber splice closure C13 to dwelling 13. Similarly, one or more of the other fibers F2-F12 can be cut and removed from the cable 210 at or near each respective dwelling 14-24. The newly cut ends of the respective fibers F2-F12, which are still optically connected to the first distribution point 230, can be spliced to a respective drop cable (not shown) similar to drop cable D12, for example, at a fiber splice closure (not shown) similar to closure C12 and run to dwellings 14-24.

However, rather than wasting lengths of the cut fibers F1-F12 that provide services to dwellings 13-24, the remaining lengths of the fibers F1-F12, which are optically connected to the second distribution point 232, are cut and removed from the distribution cable 210 so that they can be spliced to drop cables that run to dwellings 25-36. For example, the remaining length of fiber F1 can be spliced to a drop cable D25, for example, at a fiber splice closure C25. The drop cable D25 runs from the fiber splice closure C25 to dwelling 25. Similarly, one or more of the other fibers F2-F12 can be cut and removed from the cable 210 at or near each respective dwelling 26-36. The newly cut ends of the respective fibers F2-F12, which are still optically connected to the second distribution point 232, can be spliced to a respective drop cable (not shown) similar to drop cable D25 for example, at a fiber splice closure (not shown) similar to closure C25 and run to dwellings 25-36.

As the cable 210 extends from the second distribution point 232 and reaches or nears dwelling 37, the first fiber F1 can be removed from the cable 210. The first fiber F1 can be cut and the end of the fiber F1 that is still optically connected to the second distribution point 232 can be spliced to a drop cable D37, for example, at a fiber splice closure C37. The drop cable D37 runs from the fiber splice closure C37 to dwelling 37. Similarly, one or more of the other fibers F2-F12 can be cut and removed from the cable 210 at or near each respective dwelling 38-48. The newly cut ends of the respective fibers F2-F12, which are still optically connected to the second distribution point 232, can be spliced to a respective drop cable (not shown) similar to drop cable D37 for example, at a fiber splice closure (not shown) similar to closure C37 and run to dwellings 38-48.

If no other distribution points are used, progressively small amounts of fibers F1-F11 are wasted as the cable 210 extends to dwelling 48. If a third distribution point is used, rather than wasting lengths of the cut fibers F1-F12 that provide services to dwellings 37-48, the remaining lengths of the fibers F1-F12, which are optically connected to the third distribution point, can be spliced to drop cables that run to dwellings 49-60, as described above. The above-described pattern can be repeated as necessary and/or as desired. Further, it should be understood that the distribution cable 210 may include more or less than twelve fibers, which would change the number of dwellings in each of the groups 240, 242, 244, 246. It should also be understood that one or more of the fibers F1-F12 may not be used a particular group if not needed or desired.

Figure 3A:
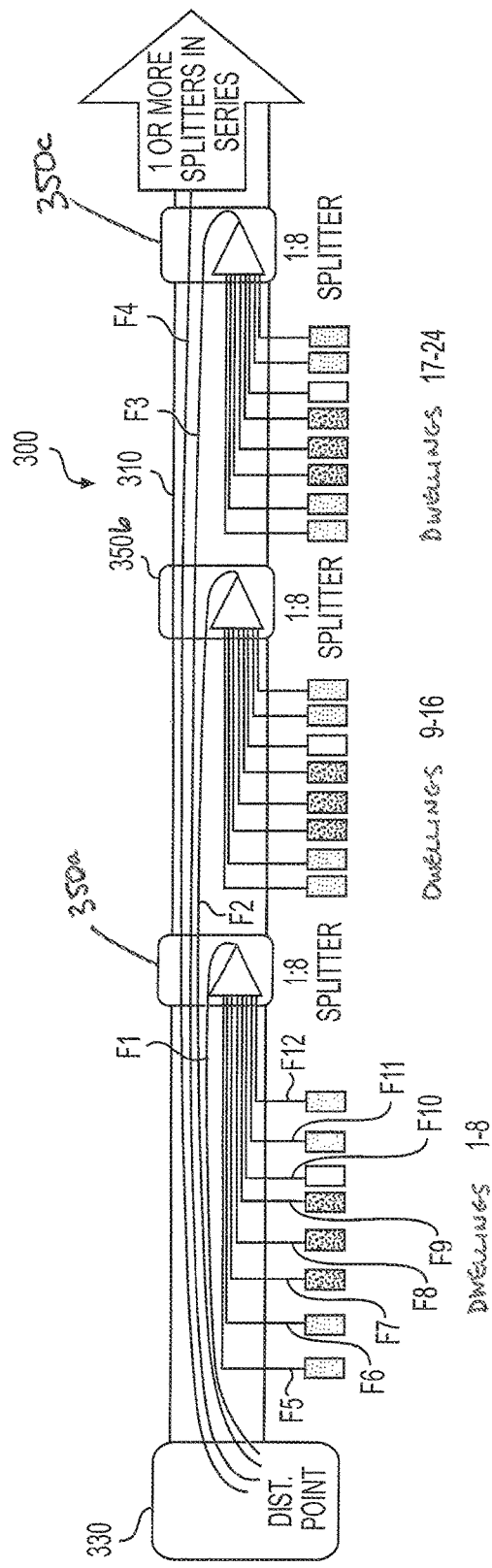
FIGS. 3A and 3B are schematic illustrations of an exemplary pull-back fiber cable installation in a passive optical network for multi dwelling units in accordance with various aspects of the disclosure.

Referring now to FIG. 3A, an exemplary pull-back fiber cable installation 300 for multi dwelling units in accordance with various aspects of the disclosure is illustrated and described. The exemplary installation 300 is a passive optical network installation including a distribution point 330 and a twelve fiber distribution cable 310 that is optically connected to four splitters 350. In particular, a first one of the fibers F1 of the cable 310 optically connects the distribution point 330 with the first splitter 350a, a second fiber F2 of the cable 310 optically connects the distribution point 330 with the second splitter 350b, a third one of the fibers F3 of the cable 310 optically connects the distribution point 330 with the third splitter 350c, and a fourth fiber F4 of the cable 310 optically connects the distribution point 330 with the fourth splitter (not shown). The eight remaining fibers F5-F12 of the distribution cable 310 are cut (creating two cut ends) and removed from the distribution cable 310 at each of the splitters 350a, 350b, 350c. A first one of the newly cut ends is optically coupled with the respective splitter, as shown in FIG. 3A. The portion of the fibers extending from the second one of the newly cut ends can be used to provide a optical signals to a dwelling units. The distribution point 330 is configured to provide an optical connection back to a base station 101 or home of an FFTx optical access network.

In the exemplary installation 300, each of the splitters 350 is a 1:8 splitter. Thus, each of the remaining eight fibers F5-F12 of the distribution cable, which are still optically connected to the splitter, can be spliced to a drop cable (not shown), for example, at a fiber splice closure (not shown), as described with respect to the previous embodiment. For example, where the fibers F5-F12 are cut and removed from the distribution cable 310 at the first splitter 350a, the first one of the cut ends is optically coupled with the first splitter 350a. Similarly, where the fibers F5-F12 are cut and removed from the distribution cable 310 at the second splitter 350b, the first one of the cut ends is optically coupled with the second splitter 350b.

As shown in FIG. 3A, the lengths of the fibers F5-F12 that are optically coupled with the second splitter 350b can be cut and removed from the cable 310 at or near each respective dwelling 9-16. The newly cut ends of the respective fibers F5-F12, which are still optically connected to the second splitter 350b, can be spliced to a respective drop cable (not shown) similar to drop cables described above at a fiber splice closure (not shown) similar to the closures described above and run to dwellings 9-16. Similarly, the lengths of the fibers F5-F12 that optically coupled with the third splitter 350c can be cut and removed from the cable 310 at or near each respective dwelling 17-24. The newly cut ends of the respective fibers F5-F12, which are still optically connected to the third splitter 350c, can be spliced to a respective drop cable (not shown) similar to drop cables described above at a fiber splice closure (not shown) similar to the closures described above and run to dwellings 17-24. It should be appreciated that the same arrangement would be provided at a fourth splitter (not shown) and apartments 25-32 (not shown). Meanwhile, the lengths of the fibers F5-F12 that are optically coupled with the first splitter 350a can be cut and removed from the cable 310 at or near each respective dwelling 1-8. The newly cut ends of the respective fibers F5-F12, which are still optically connected to the first splitter 350a, can be spliced to a respective drop cable (not shown) similar to drop cables described above at a fiber splice closure (not shown) similar to the closures described above and run to dwellings 1-8.

In the installation of FIG. 3A, up to thirty-two subscribes can be connected to the distribution point 330 (and thus to the FTTx optical access network) by the twelve fiber distribution cable 310. It should be understood that the distribution cable 310 may include more or less than twelve fibers and/or more or less than four splitters, which could change the number of dwellings in network 300. Further, the 1:8 splitter can be replaced with a 1:16 splitter, a 1:32 splitter, etc., depending on the number of fibers in the distribution cable 310 and the number of splitters in the network 300. It should also be understood that one or more of the fibers F1-F12 may not be used a particular network if not needed or desired.

Figure 3B:
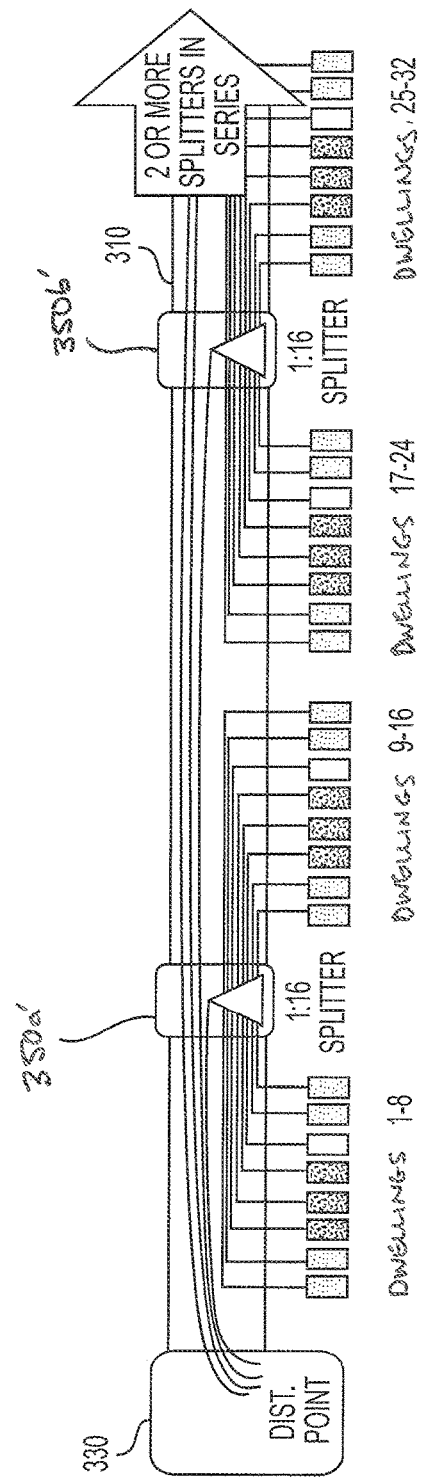

Referring now to FIG. 3B, another exemplary pull-back fiber cable installation 300 for multi dwelling units in accordance with various aspects of the disclosure is illustrated and described. The exemplary installation 300' is a passive optical network installation including the distribution point 330 and the twelve fiber distribution cable 310 that is optically connected to two splitters 350a', 350b'. In particular, a first one of the fibers F1 of the cable 310 optically connects the distribution point 330 with the first splitter 350a', a second fiber F2 of the cable 310 optically connects the distribution point 330 with the second splitter 350b', a third one of the fibers F3 of the cable 310 optically connects the distribution point 330 with the third splitter (not shown), and a fourth fiber F4 of the cable 310 optically connects the distribution point 330 with the fourth splitter (not shown). In the installation 300' of FIG. 3B, each of the splitters 350a', 350b' can be a 1:16 splitter. The eight remaining fibers F5-F12 of the distribution cable 310 are cut (creating two cut ends) and removed from the distribution cable 310 at each of the splitters 350a', 350b'. Both of the newly cut ends are optically coupled with the respective splitter, as shown in FIG. 3B. The portion of the fibers extending away from the splitters can be used to provide optical signals to dwelling units.

Similar to the embodiment of FIG. 2, as the distribution cable 310 extends from the first splitter 350a' and is at or near dwelling 8, a twelfth one of the fibers F12 is cut and removed from the cable 310, as would be understood by persons skilled in the art. The twelfth fiber F12 is cut and the newly cut end of the fiber F12, which is still optically connected to the first splitter 350a', can be spliced to a drop cable (not shown), for example, at a fiber splice closure (not shown), as described above. The drop cable is configured to run from the fiber splice closure to dwelling 8.

Although not shown for clarity purposes, one or more of the other fibers F5-F11 can be removed from the distribution cable 310 by cutting additional windows at or near each respective dwelling 1-7. The newly cut ends of the respective fibers F5-F11, which are still optically connected to the first splitter 350a', can be spliced to a respective drop cable (not shown), for example, at a fiber splice closure (not shown), as described above, and run to dwellings 1-71. Thus, progressively smaller amounts of fibers F5-F12 are wasted as the cable 310 extends from the first splitter 350a' to dwelling 1.

As the cable 310 extends from the first splitter 350a' to the second splitter 350b', the cable 310 runs past dwelling units 9-16 and dwelling units 17-24. As the cable 310 extends from the first splitter 350a' and reaches dwelling 9, the twelfth fiber F12 can be cut and removed from the cable 310, as described above. The cut end of the twelfth fiber F12, which is still optically connected to the first splitter 350a', can be spliced to a drop cable, for example, at a fiber splice closure, as described above. The drop cable is configured to run from the fiber splice closure to dwelling 9. Similarly, one or more of the other fibers F5-F11 can be cut and removed from the cable 310 at or near each respective dwelling 10-16. The newly cut ends of the respective fibers F5-F11, which are still optically connected to the first splitter 350a', can be spliced to a respective drop cable (not shown), for example, at a fiber splice closure (not shown), as described above, and run to dwellings 10-16.

However, rather than wasting lengths of the cut fibers F5-F12 that provide services to dwellings 9-16, the remaining lengths of the fibers F5-F12, which are optically connected to the second splitter 350b', are cut and removed from the distribution cable 310 so that they can be spliced to drop cables that run to dwellings 17-24. For example, the remaining length of fiber F12 can be spliced to a drop cable (not shown), for example, at a fiber splice closure (not shown), as described above. The drop cable runs from the fiber splice closure to dwelling 17. Similarly, one or more of the other fibers F5-F11 can be cut and removed from the cable 310 at or near each respective dwelling 18-24. The newly cut ends of the respective fibers F5-F11, which are still optically connected to the second splitter 350b', can be spliced to a respective drop cable (not shown), for example, at a fiber splice closure, as described above, and run to dwellings 18-24.

As the cable 310 extends from the second splitter 350b' and reaches or nears dwelling 25, the twelfth fiber F12 can be removed from the cable 310. The twelfth fiber F12 can be cut and the end of the fiber F12 that is still optically connected to the second splitter 350b' can be spliced to a drop cable (not shown), for example, at a fiber splice closure (not shown), as described above. The drop cable runs from the fiber splice closure to dwelling 25. Similarly, one or more of the other fibers F5-F11 can be cut and removed from the cable 310 at or near each respective dwelling 26-32. The newly cut ends of the respective fibers F5-F11, which are still optically connected to the second splitter 350b', can be spliced to a respective drop cable (not shown), for example, at a fiber splice closure (not shown), as described above, and run to dwellings 25-32.

The above-described pattern can be repeated for the third and fourth optical splitters (not shown) or as necessary and/or as desired. Further, it should be understood that the distribution cable 310 may include more or less than twelve fibers and/or more or less than four splitters, which could change the number of dwellings in network 300'. It should also be understood that one or more of the fibers F1-F12 may not be used a particular group if not needed or desired. In the installation of FIG. 3B, up to sixty-four subscribers can be connected to the distribution point 330 (and thus to the FTTx optical access network) by the twelve fiber distribution cable 310. Further, the 1:16 splitter can be replaced with a 1:8 splitter, a 1:32 splitter, etc., depending on the number of fibers in the distribution cable 310 and the number of splitters in the network 300'.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. An optical network for providing optical signals to multiple units and minimizing an unused length of fiber, comprising:
   a first splitter disposed between a first group of units and a second group of units;
   a second splitter disposed between a third group of units and a fourth group of units;
   a fiber distribution cable configured to optically couple the first splitter and the second splitter to a distribution point;
   wherein the first group of units, the second group of units, the third group of units, and the fourth group of units each include a first number of units and wherein the fiber distribution cable includes a second number of fibers that is greater than the first number of units;
   wherein a first fiber of the distribution cable is configured to provide an optical input to the first splitter, and a second fiber of the distribution cable is configured to provide an optical input to the second splitter;

wherein a third fiber of the distribution cable is cut between the first splitter and the second splitter;
wherein a first portion of the cut third fiber is configured to provide an optical signal from the first splitter to a first unit of the second group of units;
wherein a second portion of the cut third fiber is configured to provide an optical signal from the second splitter to a first unit of the third group of units; and
wherein the first portion of the cut third fiber is spliced to a first drop cable that runs to the first unit of the second group of units, and the second portion of the cut third fiber is spliced to a second drop cable that runs to the first unit of the third group of units such that an unused length of the third fiber is minimized.

2. The optical network of claim 1, wherein the distribution point is configured to be optically coupled with a base station of an optical access network so as to provide optical signals from the base station to the first, second, third, and fourth groups of units.

3. The optical network of claim 1, further comprising:
a third splitter disposed between a fifth group of units and a sixth group of units;
wherein the fiber distribution cable optically couples the third splitter to a distribution point; and
wherein a fourth fiber of the distribution cable is configured to provide an optical input to the third splitter.

4. The optical network of claim 3,
wherein the third fiber of the distribution cable is cut between the third splitter and the second splitter;
wherein a third portion of the cut third fiber is configured to provide an optical signal to a first unit of the fourth group of units; and
wherein a fourth portion of the cut third fiber is configured to provide an optical signal to a first unit of the fifth group of units.

5. The optical network of claim 4,
wherein the third portion of the cut third fiber is spliced to a third drop cable that runs to the first unit of the second group of units; and
wherein the fourth portion of the cut third fiber is spliced to a fourth drop cable that runs to the first unit of the third group of units.

6. The optical network of claim 3,
wherein a fifth fiber of the distribution cable is cut between the third splitter and the second splitter;
wherein a first portion of the cut fifth fiber is configured to provide an optical signal to a first unit of the fourth group of units; and
wherein a second portion of the cut fifth fiber is configured to provide an optical signal to a first unit of the fifth group of units.

7. The optical network of claim 6,
wherein the first portion of the cut fifth fiber is spliced to a third drop cable that runs to the first unit of the fourth group of units; and
wherein the second portion of the cut fifth fiber is spliced to a fourth drop cable that runs to the first unit of the fifth group of units.

8. The optical network of claim 3, wherein the fifth group of units and the sixth group of units include the first number of units.

9. An optical network for providing optical signals to multiple units and minimizing an unused length of fiber, comprising:
a first splitter;
a second splitter;
a fiber distribution cable configured to optically couple the first splitter and the second splitter to a distribution point;
wherein a first fiber of the distribution cable is configured to provide an optical input to the first splitter, and a second fiber of the distribution cable is configured to provide an optical input to the second splitter;
wherein a third fiber of the distribution cable is severed between the first splitter and the second splitter;
wherein a first portion of the severed third fiber is configured to provide an optical signal from the first splitter to a first unit, and a second portion of the severed third fiber is configured to provide an optical signal from the second splitter to a second unit such that an unused length of the third fiber is minimized;
wherein the third fiber is severed between the first splitter and the second splitter;
wherein a first portion of the severed third fiber is configured to provide the optical signal from the first splitter to the first unit and a second portion of the severed third fiber is configured to provide the optical signal from the second splitter to the second unit; and
wherein the first portion of the severed third fiber is spliced to a first drop cable that runs to the first unit of the second group of units, and the second portion of the severed third fiber is spliced to a second drop cable that runs to the first unit of the third group of units such that an unused length of the third fiber is minimized.

10. The optical network of claim 9, wherein the first splitter is located between a first group of units and a second group of units, and the second splitter is located between a third group of units and a fourth group of units; and
wherein the first unit is in the second group of units and the second unit is in the third group of units.

11. The optical network of claim 9, wherein the distribution point is configured to be optically coupled with a base station of an optical access network so as to provide optical signals from the base station to the first unit and the second unit.

12. The optical network of claim 9, further comprising:
a third splitter located between a third unit and a fourth unit; and
wherein a fourth fiber of the fiber distribution cable is configured to provide an optical input from the distribution point to the third splitter.

13. The optical network of claim 12,
wherein the third fiber of the fiber distribution cable is cut between the third splitter and the second splitter; and
wherein the third fiber of the fiber distribution cable is configured to provide an optical signal from the second splitter to the third unit and from the third splitter to the fourth unit such that an unused length of the third fiber is minimized.

14. An optical network for providing optical signals to multiple units and minimizing an unused length of fiber, comprising:
a first splitter;
a second splitter;
a multifiber cable including a first fiber configured to provide an optical input from a distribution point to the first splitter and a second fiber configured to provide an optical input from the distribution point to the second splitter;
wherein a third fiber of the multifiber cable is configured to provide an optical signal from the first splitter to a first unit and from the second splitter to a third unit such that an unused length of the third fiber is minimized;

a third splitter located between a third unit and a fourth unit;

wherein a fourth fiber of the multifiber cable is configured to provide an optical input from the distribution point to a third splitter;

wherein the third fiber of the multifiber cable is cut between the third splitter and the second splitter; and wherein the third fiber of the multifiber cable is configured to provide an optical signal from the second splitter to the third unit and from the third splitter to the fourth unit such that an unused length of the third fiber is minimized.

15. The optical network of claim 14, wherein the first splitter is located between a first group of units and a second group of units, and the second splitter is located between a third group of units and a fourth group of units; and wherein the first unit is in the second group of units and the second unit is in the third group of units.

16. The optical network of claim 14, wherein the third fiber is severed between the first splitter and the second splitter; and wherein a first portion of the severed third fiber is configured to provide the optical signal from the first splitter to the first unit and a second portion of the severed third fiber is configured to provide the optical signal from the second splitter to the second unit.

17. The optical network of claim 16, wherein the first portion of the severed third fiber is spliced to a first drop cable that runs to the first unit of the second group of units, and the second portion of the severed third fiber is spliced to a second drop cable that runs to the first unit of the third group of units such that an unused length of the third fiber is minimized.

18. The optical network of claim 14, wherein the distribution point is configured to be optically coupled with a base station of an optical access network so as to provide optical signals from the base station to the first unit and the second unit.

* * * * *